US012372106B2

(12) United States Patent
Andersen et al.

(10) Patent No.: US 12,372,106 B2
(45) Date of Patent: Jul. 29, 2025

(54) CLAMP SYSTEMS AND METHODS OF USING THE SAME WITH STEAM DRYERS

(71) Applicant: GE-Hitachi Nuclear Energy Americas LLC, Wilmington, NC (US)

(72) Inventors: Valerie A. Andersen, Wilmington, NC (US); Jack T. Matsumoto, San Jose, CA (US); Michael R. Heger, Palm Beach Gardens, FL (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 67 days.

(21) Appl. No.: 17/860,091

(22) Filed: Jul. 7, 2022

(65) Prior Publication Data

US 2023/0213048 A1 Jul. 6, 2023

Related U.S. Application Data

(60) Provisional application No. 63/297,136, filed on Jan. 6, 2022.

(51) Int. Cl.
*F16B 2/06* (2006.01)
*G21C 19/20* (2006.01)

(52) U.S. Cl.
CPC ............ *F16B 2/065* (2013.01); *G21C 19/207* (2013.01)

(58) Field of Classification Search
CPC ... F16B 2/06; F16B 2/065; F16B 2/10; G21C 19/207; F16L 23/028
See application file for complete search history.

(56) References Cited

U.S. PATENT DOCUMENTS 3,793,142 A 2/1974 Gunnarsson
3,910,610 A * 10/1975 Turner ................ F16L 55/178
285/24

(Continued)

FOREIGN PATENT DOCUMENTS

KR 10-1568187 11/2015

OTHER PUBLICATIONS

BWR steam dryer integrity, GE Nuclear Energy, Document created Nov. 2004, Publicly Available Sep. 2008 (Year: 2008).*

(Continued)

*Primary Examiner* — Kyle A Cook
(74) *Attorney, Agent, or Firm* — Alley IP (57) ABSTRACT

Clamp systems include multiple, separate clamps joinable to components subject to relative rotation. Clamps may have similarly-positioned features to simplify installation and/or removal about a small area for all clamps in the system. Each clamp cannot freely rotate relative to an adjacent clamp but does not pass vertical loads to an adjacent clamp. Clamps may use mating shapes like an extension and recess to limit rotation. Clamps fit to the perimeters of components to which they individually secure by biasing against the components. At least one clamp has a transitional surface to provide space between the clamp and component to provide containment to a weld or other joining structure. Clamp systems can be tightened by included fasteners. Crimp nuts or other locking structures can preserve the biased and secured nature of the clamps and underlying structures. Clamp systems may be used to secure or repair a lifting rod assembly.

12 Claims, 7 Drawing Sheets

(56) References Cited

U.S. PATENT DOCUMENTS

| | | | |
|---|---|---|---|
| 6,041,823 A * | 3/2000 | Kusama | F16B 7/0486 |
| | | | 411/338 |
| 7,617,963 B1 * | 11/2009 | Jensen | F16L 13/06 |
| | | | 228/44.5 |
| 8,311,179 B2 | 11/2012 | Erbes et al. | |
| 2012/0313368 A1 * | 12/2012 | Lundstrom | F16L 23/024 |
| | | | 285/337 |
| 2018/0283593 A1 * | 10/2018 | Mosier | F16L 55/18 |
| 2022/0139580 A1 * | 5/2022 | Mastopietro | G21C 13/036 |
| | | | 376/260 |

OTHER PUBLICATIONS

Carter, "BWRVIP-i 81 NP: BWR Vessel and Internals Project Steam Dryer Repair Design Criteria" Nov. 2007.

WIPO, Written Opinion in corresponding PCT application PCT/US2023/010188, Feb. 20, 2024.

WIPO, International Search Report in corresponding PCT application PCT/US2023/010188, Feb. 20, 2024.

\* cited by examiner

CLAMP SYSTEMS AND METHODS OF USING THE SAME WITH STEAM DRYERS

RELATED APPLICATIONS

This application claims priority under 35 U.S.C. § 119 to U.S. Provisional Application 63/297,136, filed Jan. 6, 2022 and incorporated by reference herein in its entirety.

BACKGROUND

Figure 1:
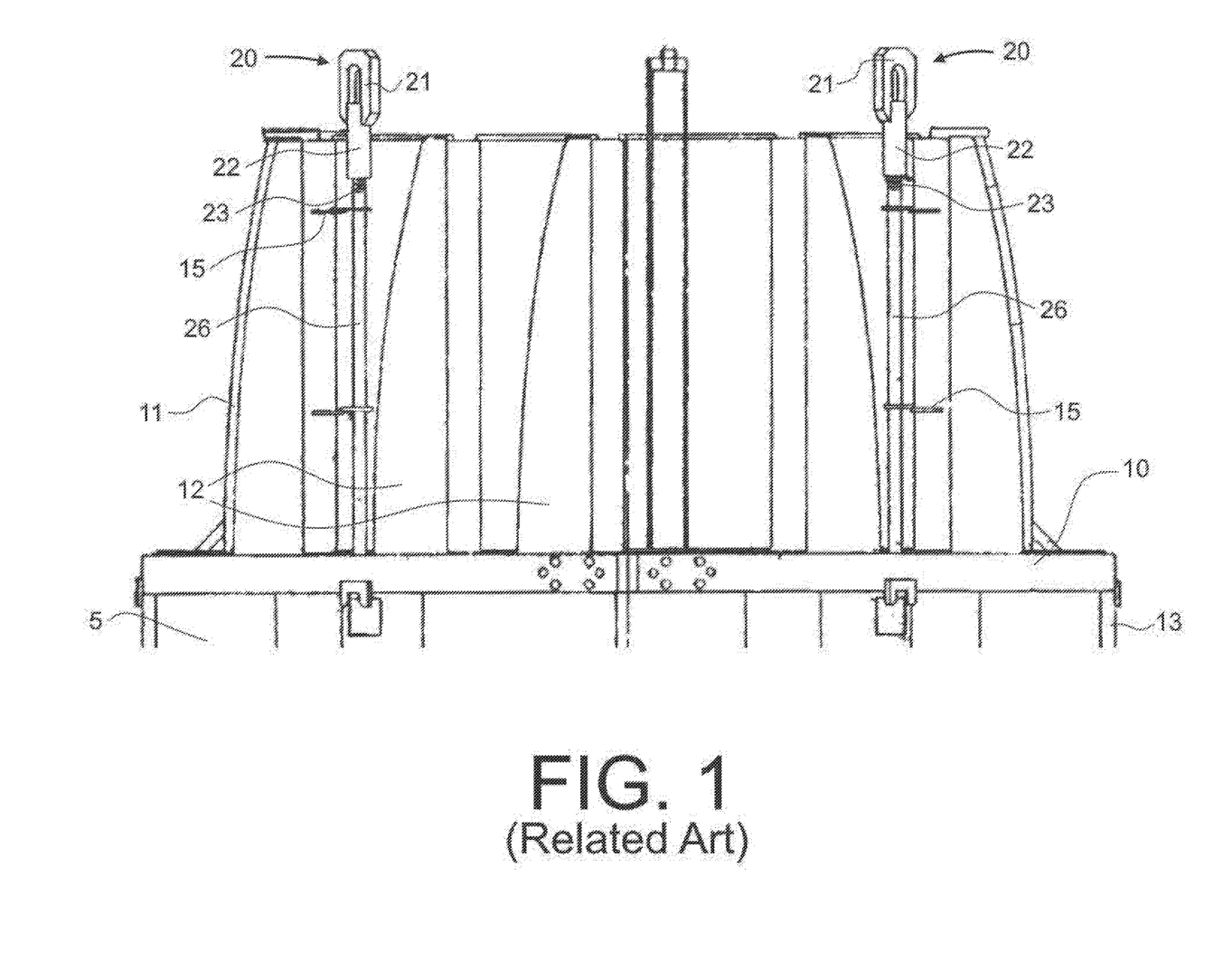
FIG. 1 is an illustration of a related art nuclear reactor steam dryer.

FIG. 1 is an illustration of a related art steam dryer 10 useable in a nuclear reactor, such as a Boiling Water Reactor steam dryer located above a core and steam separator 5. As shown in FIG. 1, dryer 10 may include hood 11 covering and directing superheated steam through baffles or vanes 12 to remove any remaining two-phase flow from the steam. Skirt 13 may position dryer 11 in an upper reactor section above and surrounding steam separator 5 below.

During construction, decommissioning, or a maintenance outage, dryer 10 may be unsecured and moved relative to the reactor, such as removal from the reactor to a staging area in containment. Such manipulation or movement may use an overhead trolley, crane, and/or cabling that secure to one or more lifting rod assemblies 20 of dryer 10. Lifting rod assemblies 20 may be positioned about an edge or interior of dryer 10 in any number, to permit reliable movement of the same. Lifting rod 26 of lifting rod assembly 20 may extend a full vertical length of vanes 12, beyond hood 11 down to a base, with one or more ligaments 15 or other connectors ensuring full secured movement to lifting rods 26.

Figure 2:
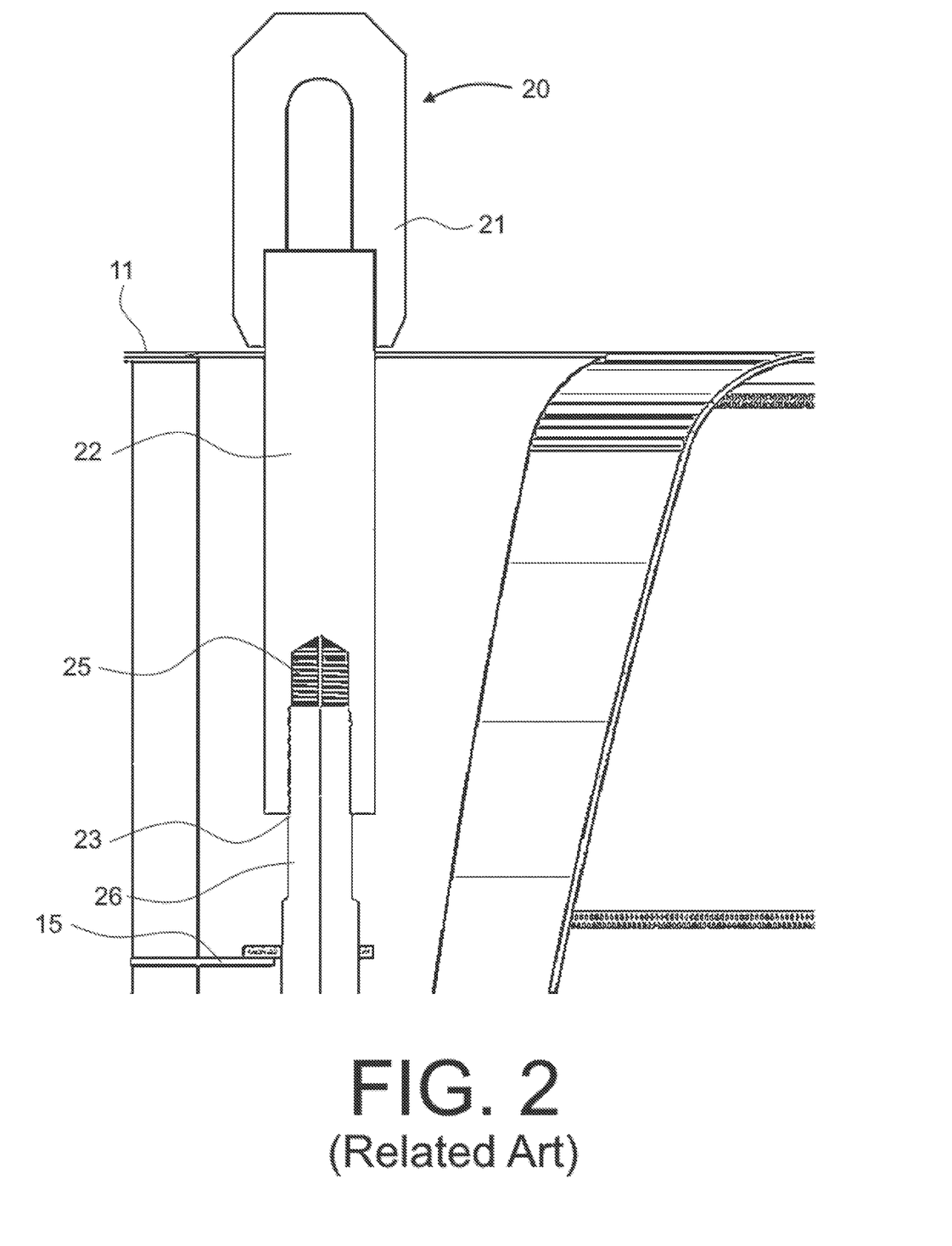
FIG. 2 is a detail illustration of a lifting rod assembly of the steam dryer of FIG. 1.

FIG. 2 is a detail illustration about an end of lifting rod assembly 20, showing a connection between lifting eye 21, lifting lug 22, and lifting rod 26. As shown in FIG. 2, lifting eye 21 and its lower lifting lug 22 may extend above a top of hood 11 for clearance handling. Lifting eye 21 and lug 22 may attach to lifting rod 26 via threads 25 in a central hole of lug 22 receiving an oppositely-threaded end of lifting rod 26 or other connection, to allow assembly with lifting rod 26 that is more rigidly joined with hood 11 and/or ligaments 15. Eventually, lifting lug 22 and lifting rod 26 may be more permanently secured, such as by tack weld 23 at a shoulder of lug 22 and lifting rod 26, or other connection that prevents movement including rotation of lifting lug 22 relative to lifting rod 26.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments include systems of clamps for repairing rotatable components like a lifting lug and lifting rod of a steam dryer lifting rod assembly. Multiple and independently-tightening and -loosening clamps can tighten on different components so as to move with the same. The clamps can prevent rotation between the components by limiting rotation amongst themselves, such as by blocking one another, potentially after limited rotation of about 2 degrees, for example. The clamps may otherwise be separately moveable and not convey translation forces between them. For example, the clamps may use corresponding shapes like a tab and recess separated by a gap to achieve rotation-only limitation. Clamps may be individually matched to the shapes of the underlying components to which they affix, such that clamps may take on distinct shapes and sizes. For example, clamps may be substantially round clamshell clamps of varying diameters. In this way, where for example a lifting rod is screwed and welded into a lifting lug hole, at least one of the clamps can contain the hole and/or weld between its adapted inner surface and the lifting rod, limiting flow vibrations and debris dispersion. Example embodiment clamp systems may not use separate pieces for tightening them about underlying components. For example, a swing bolt that is captured in the clamp and can only be moved between a tightening and opened position with respect to the clamp can be used. Associated nuts, washers, and any other tightening element may be similarly captured. If a crimp nut, ratchet surface, or other lock is used, clamps may be locked at desired tightness without further components. Each clamp within an example embodiment system may have mirrored tightening components, such as a bolt and hinge at same relative positions, to simplify installation and/or removal about a small area for all clamps.

Example methods can use example embodiment clamps systems to repair a steam dryer lifting rod assembly. In an example method, different clamps can be drawn around the lifting lug and lifting rod on either side of where the two pass into each other to form the lifting rod. Once affixed, the clamps may be separate yet still be positioned close enough to stop themselves, and the lifting lug and lifting rod, from rotating. For example, a tab and recess may be interposed during installation to allow up to 2 degrees of relative rotation and then stop the same. The clamps may be tightened by rotating a hinged bolt into a clamp recess and tightening a nut on the bolt to draw together clamp pieces. Additional pieces may not be required to so tighten the bolts, as all clamp pieces, bolts, nuts, washers, etc. may be joined as a single component that cannot be lost and allow simplified installation. The bolts may be locked in place to secure the clamps on the lifting lug and lifting rod. The dryer may then be installed or otherwise handled in any manner via the lifting rod, which has reduced likelihoods of failure and creating debris in or around the reactor when subject to example embodiment clamping systems.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion. The use of "etc." is defined as "et cetera" and indicates the inclusion of all other elements belonging to the same group of the preceding items, in any "and/or" combination(s). Modifiers "first," "second," "another," etc. may be used herein to describe various items, but they do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). When describing electronic devices, terms such as "connected" and "communicatively connected" include all variations of non-human information exchange and routing between two devices, including intermediary devices, networks, etc., connected wirelessly or not. Similarly, when describing computerized networks, the term "real time" and the like takes on its plain meaning, including operations executed at a speed and volume beyond human execution, such as two events that would require discrete or separated human actions over time occurring in direct sequence or simultaneously to human perception.

As used herein, singular forms like "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

As used herein, "axial" and "vertical" directions are the same up or down directions oriented along the major axis of a nuclear reactor, often in a direction oriented with gravity. "Transverse" directions are perpendicular to the "axial" and are side-to-side directions at a particular axial height, whereas "radial" is a specific transverse direction extending perpendicular to and directly away from the major axis of the nuclear reactor.

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventors have recognized that steam dryer lifting structures, including lifting rod assembly 20, are subject to large amounts of flow-induced vibration during operation in nuclear reactors in addition to other challenging operating conditions. Related methods of steam dryer manipulation using the lifting rod assemblies ultimately loads individual rod pieces, including welds connecting the pieces, resulting in cracking, failure, and debris dispersion. Transverse forces from vibration and otherwise and weld failures can result in eye rotation or even detachment from the lift rod as well as introducing broken pieces into a reactor and surrounding environment. To overcome these newly-recognized problems as well as others, the inventors have developed example embodiments and methods described below to address these and other problems recognized by the inventors with unique solutions enabled by example embodiments.

The present invention is clamping systems and methods of using the same in nuclear reactors. In contrast to the present invention, the few example embodiments and example methods discussed below illustrate just a subset of the variety of different configurations that can be used as and/or in connection with the present invention.

Figure 3:
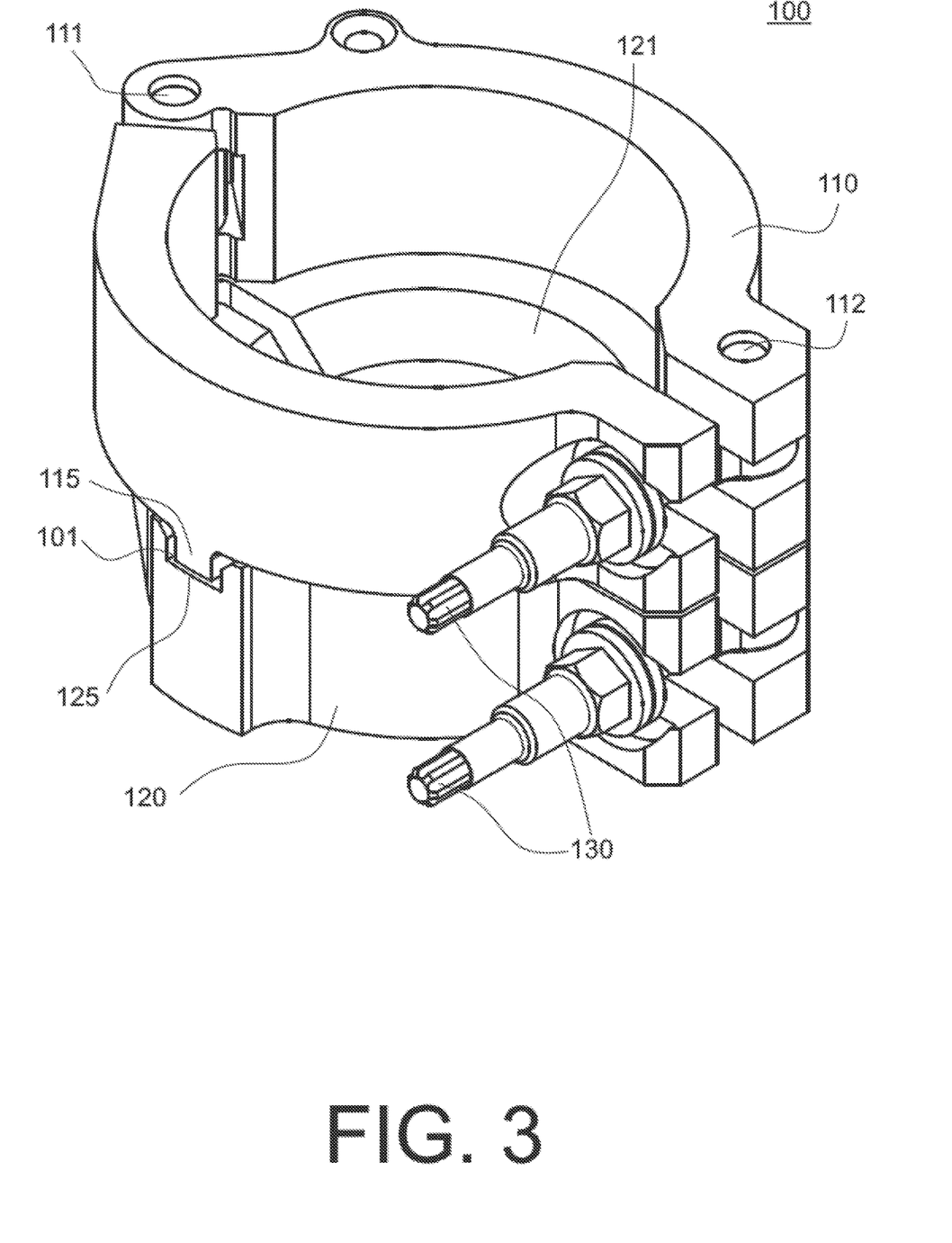
FIG. 3 is a perspective illustration of an example embodiment clamping system.

FIG. 3 is an illustration of an example embodiment lifting rod repair clamp system 100 useable to repair and/or secure components in a nuclear reactor. As shown in FIG. 3, example embodiment clamp system 100 includes multiple independent clamping parts to surround and/or seat to components, such as lifting rod assembly 20 (FIGS. 1-2). For example, upper lifting lug clamp 110 may be a clamshell clamp with two annular halves that are sized to fit around a lifting lug 22 (FIG. 2) of lifting rod assembly 20, and lower lifting rod clamp 120 may be a clamshell clamp with two annular halves that are sized to fit around lower lifting rod 26 (FIG. 2) of lifting rod assembly 20. Clamps 110 and 120 may directly contact the lifting lug and lifting rod and secure to the same via friction. Bonding, lubricant, and/or intervening structures may also be used to provide a desired connection between clamps 110 and 120 and the lifting rod assembly surfaces, as well as gaps between clamp halves and between other components within individual clamps.

Figure 5:
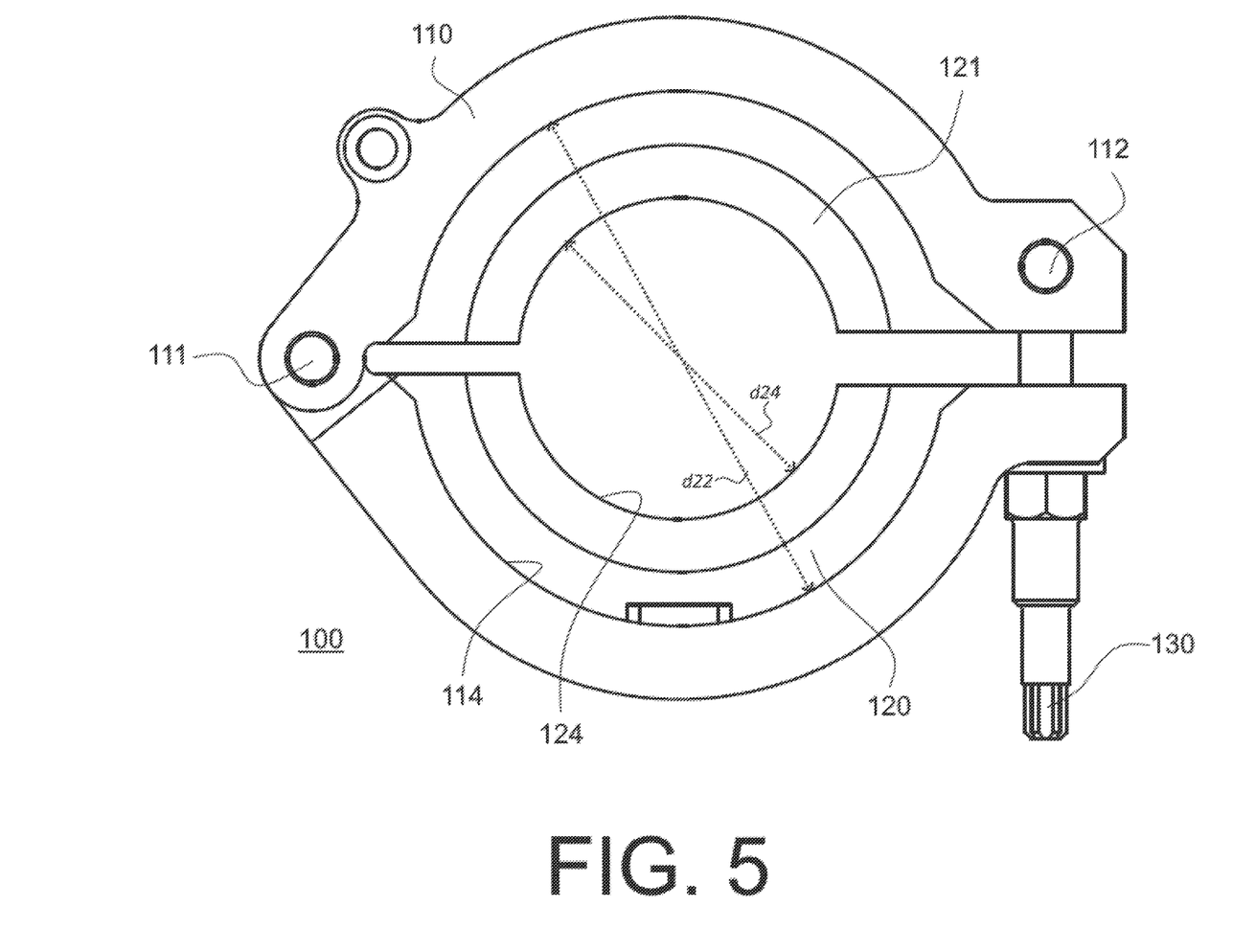
FIG. 5 is a top view of the example embodiment clamping system of FIG. 3.

For example, as shown in FIG. 3 and FIG. 5, upper clamp 110 may have a substantially circular inner surface 114 of diameter d22 shaped to match an outer perimeter of lifting lug 22 (FIG. 2). Lower clamp 120 may have a smaller substantially circular inner surface 124 of lesser diameter d24 shaped to match an outer perimeter of lower lifting rod 26 (FIG. 2). For example, d22 may be approximately 5 inches in diameter, while d24 may be approximately 3 inches in diameter, or any specific sizes matching outer diameter(s) of the lifting rod. Of course, elliptical, prismatic, and any other shape surfaces may be used for surfaces 114 and 124 to achieve a desired fit. Because example embodiment system 100 may be secured at a shoulder covering a tack weld between lifting lug 22 and lower lifting rod 26 (FIG. 2), transitional surface 121 may angle or otherwise close toward lesser diameter d24 in lower clamp 120 to fit to the shoulder and cover the weld. With these and other shapes, clamps 110 and 120 may substantially surround, enclose, and/or secure to a lifting rod assembly in a nuclear reactor.

As shown in FIG. 3, clamps 110 and 120 may each include an adjustment hinge 111 and tightening bolts 130 to permit opening and closing, as well as loosening and tightening, of the same about the lifting rod assembly. Tightening bolts 130 may be captured in and not completely inseparable from, clamps 110 and 120, such as via bolt hinge 112 in each clamp 110 and 120. In this way bolts 130 may be swung in and out of capturing portions of clamps 110 and 120 during installation and removal. If clamps 110 and 120 are made of inseparable pieces, there may be reduced or minimal risk of loose parts entering a reactor or lost components that may impede installation. While clamshell style clamps with two annular halves are shown for clamps 110 and 120 in FIG. 3, it is understood that other types of clamps, such as cinch, ratchet, orifice, etc. clamps can be used for upper and lower clamps 110 and 120.

Figure 4:
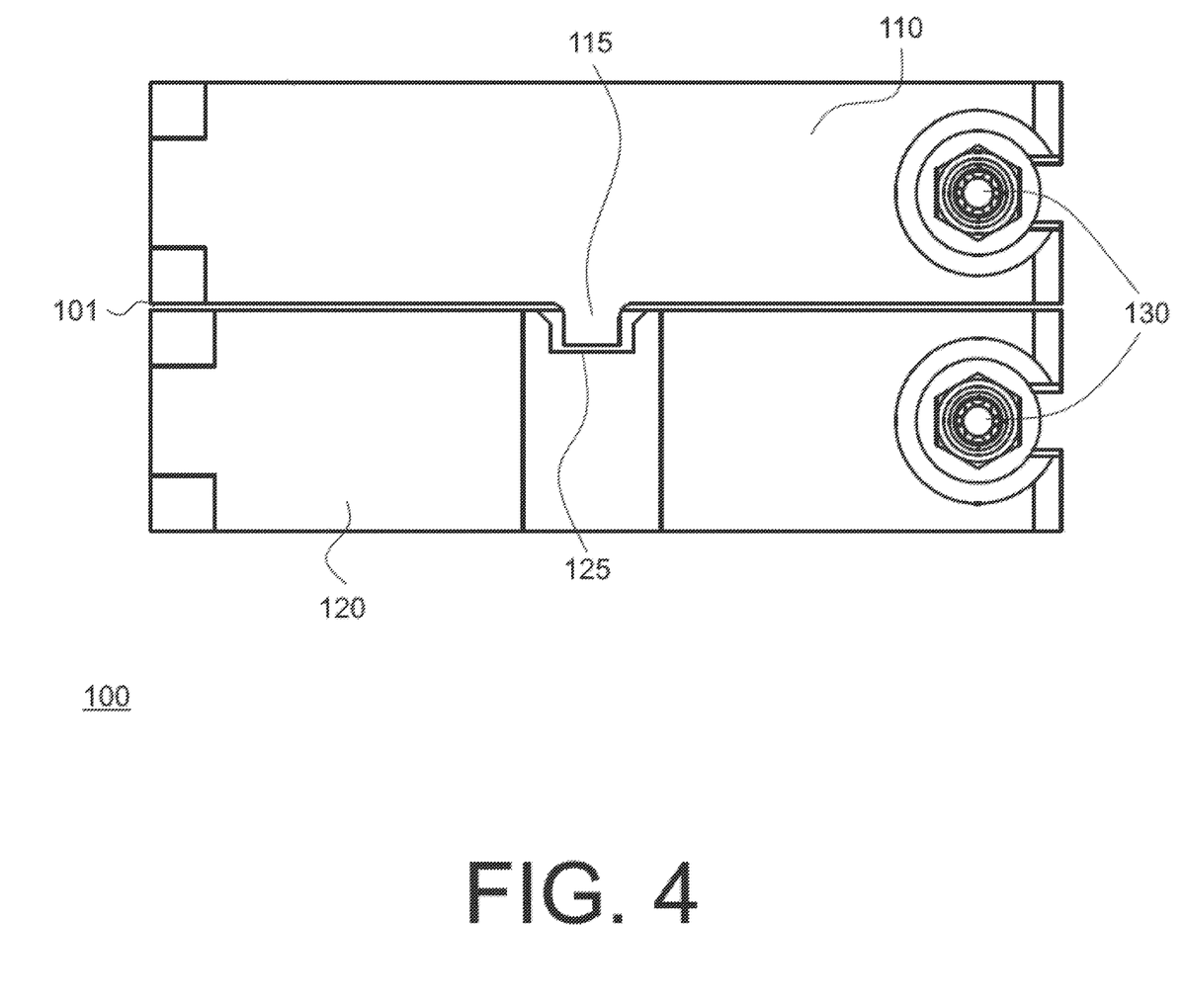
FIG. 4 is a front view of the example embodiment clamping system of FIG. 3.

As shown in FIGS. 3 and 4, example embodiment lifting rod assembly repair clamp system 100 may provide gap 101 between upper and lower clamps 110 and 120. For example, gap 101 may be a 0.05-inch vertical gap at its narrowest points. Gap 101 may be complete, keeping upper and lower clamps 101 entirely separate with no direct contact, or gap 101 may be partial, with upper and lower clamps 110 and 120 contacting, joining, or otherwise relating at certain points. For example, gap 101 may be filled with an elastic, spring, or O-ring type material, a lubricant, a soluble separator, dampener structure, etc. Gap 101 may be maintained by clamps 110 and 120 being secured to the underlying lift rod. If gap 101 is complete in the vertical direction or otherwise does not transmit substantial force in the vertical direction, gap 101 may prevent vertical load transfer between clamps 110 and 120 and/or underlying lift rod portions, preventing system 100 from being in a load path of the lifting rod assembly. In this way, example embodiment system 100 may not be loaded or transmit forces during hold-down operations, seismic events, and movement of the steam dryer via lift rods.

Clamps 110 and 120 may have limited relative rotation about a vertical axis. For example, through tab 115 in upper clamp 110 and recess 125 in lower clamp 120, clamps 110 and 120 may be limited from rotating beyond a small amount, such as a thickness of gap 101 in the transverse direction formed a size different in recess 125 and tab 115. When tab 115 is driven against an edge of recess 125, such as by transverse loading or flow-induced vibration affecting a lifting rod assembly underlying clamps 110 and 120, the secured nature of clamps 110 and 120 may prevent further relative rotation. For example, through sizing, gap 101 may allow about 2 degrees or fewer of relative rotation between clamps 110 and 120 about a vertical central axis. Because tab 115 and recess 125 may not otherwise lock or secure, no significant vertical loading may be incurred between clamps 110 and 120 while preventing relative rotation.

Figure 6:
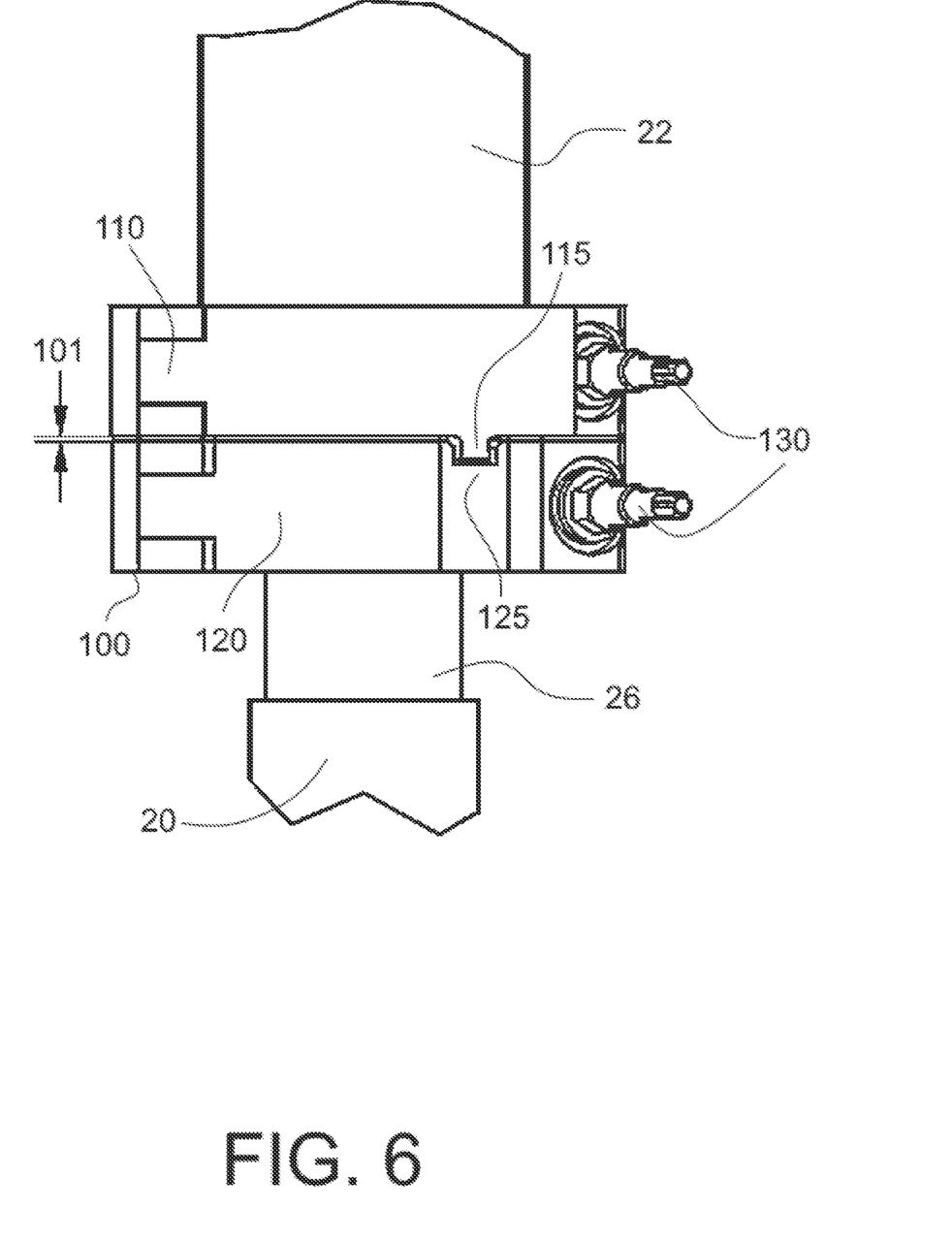
FIG. 6 is an illustration of an example embodiment clamping system installed on a steam dryer lifting rod assembly.
Figure 7A:
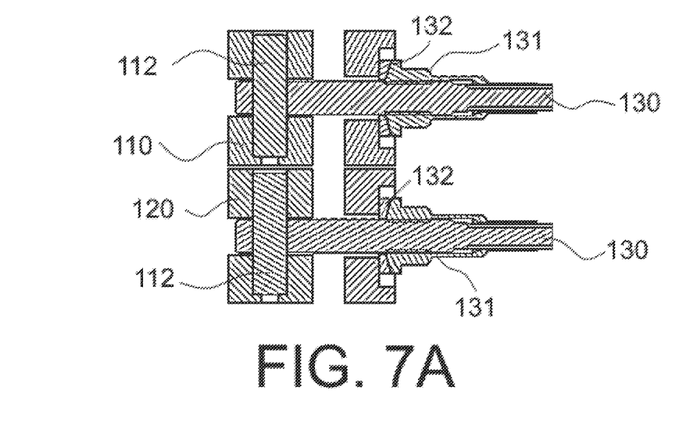
FIG. 7A is a cross-sectional view of a front face of the example embodiment clamping system of FIG. 6.
Figure 7B:
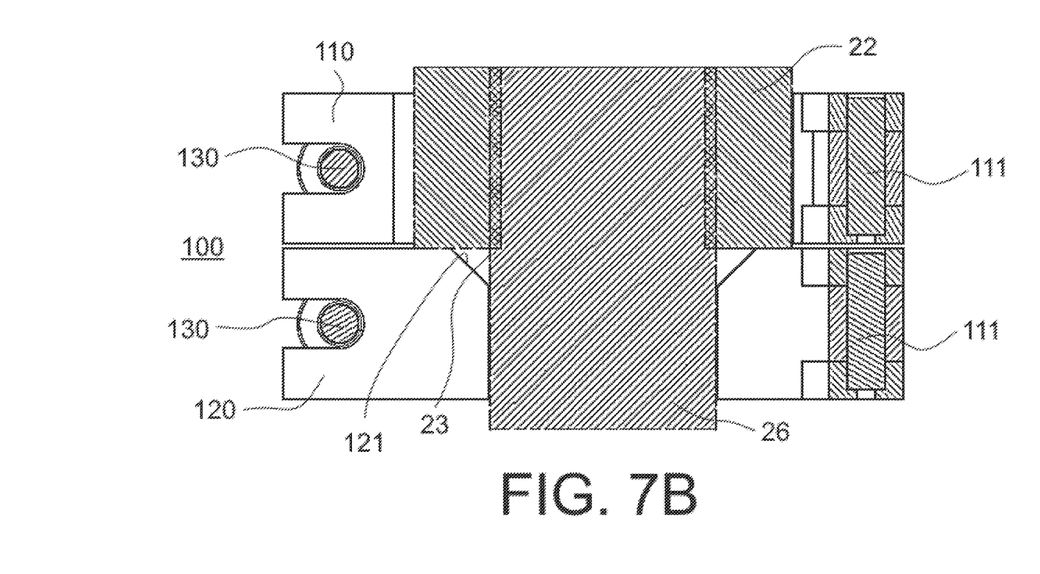
FIG. 7B is a cross-sectional view of the center of the example embodiment clamping system installed on the steam dryer lifting rod assembly of FIG. 6.

FIGS. 6 and 7 illustrate example embodiment lifting rod repair clamp system 100 following an example installation method on a lifting rod assembly. For example, system 100 may be installed at a shoulder between lifting lug 22 and lower lifting rod 26 to cover tack welds 23 (FIG. 2). Either of clamps 110 and 120 can be independently opened and passed around lifting rod assembly 20 at any desired position, such as the shoulder. As seen in FIG. 7B, transitional surface 121 of lower clamp 120 may be matched to surround tack weld 23, with a top of clamp 120 seating against lifting lug 22, during some installations. This containment of weld 23 may limit damage to welds 23 that may be present and limit weld or other pieces that do break off from lifting rod assembly 20 from entering reactor fluid or otherwise causing a hazard. As shown in FIG. 6, during placement, tab 115 may be fitted into recess 125 while maintaining gap 101. Alternatively, clamps 110 and 120 may be installed together, such as a single unit, with tab 115 and recess 125 aligned and a spring, filler, or soluble separator forming gap 101.

Each bolt 130 may be tightened to a desired tension to close and secure clamps 110 and 120 via a friction or other fit on lifting rod assembly 20. FIG. 7A shows a front cross-section of two bolts 130 in a swing bolt style that have been rotated into capturing portions of bodies of clamps 110 and 120 via bolt hinges 112. Bolt 130 may include threads that mesh with counter-threads in outer nut 131 or in a bore of an associated clamp body, such that rotation tightens or loosens bolt 130 and the associated clamp. Outer nut 131 may provide a gripping and crimp-able surface for such rotation, while allowing its outer surface to be deformed against, and locked to, bolt 130 as a crimp nut, when a desired tension is reached. Spherical washer 132 may distribute bearing load from nut 131 evenly across the clamp body and reduce seizing during rotation. Conversely, outer nut 131 may be loosened via reverse rotation, potentially after cutting or dilation, to loosen associated clamps. Bolts 130 may swing out of capturing portions of the associated clamps, and clamps 110 or 120 may be wholly removed from underlying structures if desired.

Because all of bolt 130, outer nut 131, spherical washer 132, and any other tensioning components may be inseparable from clamp 110 or 120, such as via bolt hinge 112, no loose pieces, welding, and/or external parts may be required for tightening, which may use a single tensioning tool or manual rotation. Similarly, because bolts 130 may be at a single, shared front interface of clamps 110 and 120, all installation and removal may occur at a single point, potentially with simple remote tooling, without further interference with a steam dryer in any location in a nuclear plant. Of course, other tensioning structures can be used in example embodiment system 100, including ratchets, simple bolt-and-nut arrangements, elastic or cinching materials, etc. that tighten and secure clamps 110 and 120 to desired lift rod positions.

Although two clamps 110 and 120 are shown in example embodiment system 100 installed about a shoulder of a lifting lug of a steam dryer lifting rod assembly in some examples, it is understood that additional clamps can be used. Further, rotational-limitations between all such clamps in example embodiments can be employed, such as through successive tabs 115 and recesses 125. Similarly, while clamps 110 and 120 are shown the same clamshell clamp shape in some examples, with two annular halves that are closed and open via bolts 130, clamps 110 and 120 may use designs different from each other and include unique tensioning structures.

Example embodiment clamp system 100 may be fabricated of materials that are compatible with an operating nuclear reactor environment, including materials that maintain their physical characteristics when exposed to high-temperature fluids and radiation without substantially changing in physical properties, such as becoming substantially radioactive, melting, brittling, retaining/adsorbing radioactive particulates, etc. For example, metals such as stainless steels and iron alloys, nickel alloys, zirconium alloys, etc., including austenitic stainless steels 304 or 316, XM-19, Alloy 600, etc., are useable in system 100 components. Similarly, direct connections between distinct parts and all other direct contact points may be lubricated and/or fabricated of alternating or otherwise compatible materials to prevent seizing, fouling, metal-on-metal reactions, etc.

Some example embodiments and methods thus being described, it will be appreciated by one skilled in the art that examples may be varied through routine experimentation and without further inventive activity. For example, although clamps of differing diameters are used in some example systems, it is understood that other clamp sizes and shapes are useable with examples. Variations are not to be regarded as departure from the spirit and scope of the example embodiments, and all such modifications as would be obvious to one skilled in the art are intended to be included within the scope of the following claims.

The invention claimed is:

1. A method of repairing a steam dryer lifting rod assembly extending in a longest dimension along a vertical axis and having a lifting lug connected to a lifting rod and including a weld on an outside of and joining the lifting lug and the lifting rod, the method comprising:
   tightening a first clamp around the lifting lug so as to be fixed on the lifting lug;
   tightening a second clamp around the lifting rod so as to be fixed on the lifting rod, wherein the tightenings position the first clamp into the second clamp to block the first and second clamps and underlying lifting lug and lifting rod from rotating more than 2 degrees relative to one another in either direction on the vertical axis, wherein the first and second clamps are clamshell clamps having round inner perimeters, wherein the second clamp includes a transitional surface shaped to contain and not directly contact the weld, and wherein the tightening the second clamp positions the second clamp to cover the weld so that pieces of the weld are limited from breaking off and exiting the second clamp.

2. The method of claim 1, wherein the tightenings position a gap between the second clamp and the first clamp so the second clamp does not directly touch the first clamp.

3. The method of claim 1, wherein the round inner perimeter of the first clamp matches the outer perimeter of the lifting lug, and wherein the round inner perimeter of the second clamp is smaller than the inner perimeter of the first clamp and matches an outer perimeter of the lifting rod.

4. The method of claim 1, wherein the tightening the second clamp around the lifting rod further positions a top surface of the second clamp in direct contact with a bottom surface of the lifting lug, positions an inner perimeter of the second clamp in direct contact with an outer perimeter of the lifting rod, and does not put the first clamp and the second clamp in direct contact.

5. The method of claim 1, wherein the tightening the first clamp includes tightening a bolt in the first clamp, wherein the bolt is moveable relative to the first clamp and cannot be removed from the first clamp.

6. The method of claim 5, wherein the tightening the first clamp further includes rotating a crimp nut on the bolt, the method further comprising:
   locking the first clamp by deforming the crimp nut against the bolt.

7. The method of claim 1, wherein the first clamp includes a tab extending vertically downward from a bottom of the first clamp, and wherein the second clamp includes a recess extending vertically downward from a top of the second clamp, and wherein the recess is larger than the tab so as to allow the tab to move within the recess.

8. The method of claim 7, wherein the tightenings position the tab into the recess without directly contacting the first clamp to the second clamp to block the first and second clamps and underlying lifting lug and lifting rod from rotating more than 2 degrees relative to one another in either direction on the vertical axis.

9. The method of claim 1, wherein the first clamp includes a primary hinge and a bolt configured to tighten the first clamp, wherein the bolt is a swing bolt pivotable on a secondary hinge in the first clamp and cannot be removed from the first clamp.

10. The method of claim 9, wherein the bolt includes a threaded surface and a corresponding crimp nut on the threaded surface, the method further comprising:
    locking the first clamp, after the tightening the first clamp, by deforming the crimp nut onto the bolt.

11. The method of claim 9, wherein the first clamp includes a tab extending vertically downward from a bottom of the first clamp, and wherein the second clamp includes a primary hinge and a bolt, wherein the second clamp includes a recess extending vertically downward from a top of the second clamp, and wherein the tightenings position the tab into the recess and simultaneously positions the primary hinges and bolts of the first clamp and the second clamp at same position vertically adjacent to one another on the lifting rod assembly.

12. A method of repairing a steam dryer lifting rod assembly extending in a longest dimension along a vertical axis and having a lifting lug connected to a lifting rod and having a weld on an outside of and joining the lifting lug and the lifting rod, the method comprising:
    tightening a first clamp around the lifting lug so as to be fixed on the lifting lug; and
    tightening a second clamp around the lifting rod so as to be fixed on the lifting rod, wherein the tightenings position one of the first clamp and the second clamp into the other of the first clamp and the second clamp to block the first clamp and underlying lifting lug from unlimited rotation in either direction on the vertical axis relative to the second clamp and underlying lifting rod, wherein the first and second clamps are clamshell clamps having round inner perimeters, wherein the second clamp includes a transitional surface shaped to contain and not directly contact the weld, wherein the round inner perimeter of the first clamp matches an outer perimeter of the lifting lug, and wherein the round inner perimeter of the second clamp is smaller than the inner perimeter of the first clamp and matches an outer perimeter of the lifting rod.

\* \* \* \* \*